United States Patent
Vasarainen (10) Patent No.: US 6,574,241 B2
(45) Date of Patent: Jun. 3, 2003

(54) MESSAGE MONITORING IN A NETWORK ELEMENT

(75) Inventor: Juha Vasarainen, Piikkio (FI)

(73) Assignee: Nokia Corporation, Espoo (FI)

( * ) Notice: Subject to any disclaimer, the term of this patent is extended or adjusted under 35 U.S.C. 154(b) by 46 days.

(21) Appl. No.: 09/795,379

(22) Filed: Feb. 28, 2001

(65) Prior Publication Data

US 2002/0126653 A1 Sep. 12, 2002

Related U.S. Application Data (63) Continuation of application No. PCT/FI99/00850, filed on Oct. 14, 1999.

(30) Foreign Application Priority Data

Oct. 14, 1998 (FI) .................................................. 982224

(51) Int. Cl.⁷ .............................................. H04L 12/66
(52) U.S. Cl. ........................ 370/469; 370/253; 709/230
(58) Field of Search ................................ 370/385, 242, 370/250, 251, 469; 379/12, 15.02, 15.05, 111, 114.28, 34; 709/230

(56) References Cited

U.S. PATENT DOCUMENTS

| | | | | | |
|---|---|---|---|---|---|
| 5,563,874 A | * | 10/1996 | Kant | ....................... | 340/825.2 |
| 5,574,782 A | * | 11/1996 | Baird et al. | ............ | 379/221.09 |
| 5,579,371 A | * | 11/1996 | Aridas et al. | ............... | 370/522 |
| 5,757,895 A | * | 5/1998 | Aridas et al. | .......... | 379/114.28 |
| 5,802,146 A | | 9/1998 | Dulman | | |
| 5,867,558 A | * | 2/1999 | Swanson | ...................... | 379/12 |
| 6,018,567 A | * | 1/2000 | Dulman | ..................... | 379/120 |
| 6,028,914 A | * | 2/2000 | Lin et al. | .................... | 379/133 |
| 6,154,467 A | * | 11/2000 | Hager et al. | ................ | 370/467 |
| 6,226,680 B1 | * | 5/2001 | Boucher et al. | ............ | 709/230 |
| 6,341,162 B1 | * | 1/2002 | Kelly et al. | ............ | 379/207.02 |
| 6,359,976 B1 | * | 3/2002 | Kalyanpur et al. | ......... | 379/111 |
| 6,389,479 B1 | * | 5/2002 | Boucher et al. | ............ | 709/230 |

FOREIGN PATENT DOCUMENTS

| | | |
|---|---|---|
| EP | 0782311 A2 | 7/1997 |
| WO | WO 99/56451 | 11/1999 |

* cited by examiner

*Primary Examiner*—Hassan Kizou
*Assistant Examiner*—David Odland
(74) *Attorney, Agent, or Firm*—Squire Sanders & Dempsey LLP (57) ABSTRACT

The present invention relates to a method for monitoring data messages in a network element in a telecommunications network, particularly in the SCP network element of an intelligent network. In the network element, the messages are forwarded through a protocol stack. The messages of the various protocol levels are processed by useful program blocks (MDP, FMP, SLP) and the messages of the selected protocol level are monitored to verify their validity. To make it possible to monitor messages in a simpler and more reliable manner, a separate monitoring block (MPP) is created in the network element for monitoring purposes and a copy of the message of the selected protocol level is sent to the said monitoring program to effect monitoring.

6 Claims, 5 Drawing Sheets

CallInformationReportArg

SEQUENCE

SIZE(1...5) OF (reqInfoList) = 3

Fig. 10

- reqInfoType...ENUM (0,1,2,30) = 0
- CHOICE = 1
    - reqInfoAttemptElapsedTime        INT (0...255) = 128
    - reqInfoCallStopTimeVal           BCD(6) = 123abc
    - reqInfoConnElapsedTimeVal        Integer4 = 1
    - SEQUENCE NO_ASN1                 STR(2...12) = ABCD
        - reqInfoRelCauseCodingStd     INT(Bitsize2) = 2
        - reqInfoRelCauseLocation      INT(Bitsize4) = 15
        - reqInfoRelCauseCauseVal      INT(Bitsize7) = 62
        - reqInfoRelCauseDiag          STR(0...10) = 62

US 6,574,241 B2

MESSAGE MONITORING IN A NETWORK ELEMENT

This is a continuation of PCT/FI99/00850, filed Oct. 14, 1999.

FIELD OF THE INVENTION

Generally, the present invention relates to monitoring data messages in a communications network. One preferred application environment for the invention is a network element in an intelligent network, such as a SCP network element, but the solution in accordance with the invention can be used in any network elements where messages of a given protocol level are to be monitored in order, for example, to verify their validity. In the following, the invention will be described using an intelligent network as an example because the invention was created largely in response to the problems associated with intelligent networks.

BACKGROUND OF THE INVENTION

With the rapid advancement of the telecommunications field, operators are now in a position to offer users a wide range of services. A network architecture providing advanced services is known as an Intelligent Network, commonly referred to as IN.

Figure 1:
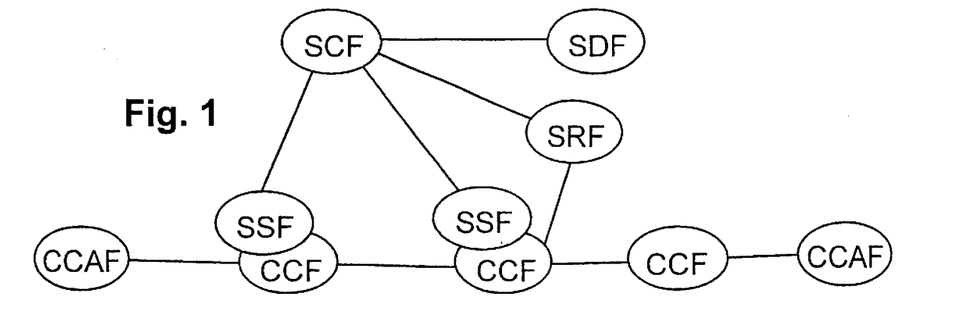
FIG. 1 illustrates the functional architecture of an intelligent network.

The functional architecture of the intelligent network is illustrated in FIG. 1 where the functional entities of the networks are shown as ovals. A brief description of this architecture is given below because the invention is later explained with reference to the intelligent network environment.

Access of the end-user (subscriber) to the network is controlled by the CCAF function (Call Control Agent Function). Access to IN services is provided by making additions to the existing digital exchanges. This is achieved by making use of the Basic Call State Model BCSM that describe,s the existing functionality used for processing a call between users. BCSM is a high-level state automation model for the CCF call control functions required for setting up and maintaining the connection path between the users. Functionality is added to this state model by using the Service Switching Function SSF (cf. the partial overlapping of the functional entities CCF and SSF in FIG. 1) to make it possible to decide when intelligent network services (IN services) should be invoked. Once these IN services have been invoked, the Service Control Function SCF that incorporates the service logic for the intelligent network handles service-dependent processing (of the call attempt). Thus, the Service Switching Function SSF links the Call Control Function CCF to the Service Control Function SCF and allows the SCF function to control the Call Control Function CCF. For example, SCF may request SSF/CCF to perform certain call or set-up functions, such as billing or routing operations. SCF may also send requests to the Service Data Function SDF that controls access to intelligent network service-dependent information and network data. For example, SCF may ask SDF to retrieve data related to a certain service or to update such data.

The functions described above are further complemented by the specialized resources function SRF which provides the special functions required for implementing some of the services provided by the intelligent network. Examples of such services are protocol conversions, speech recognition, voice mail, etc. For example, SCF may request the SSF/CCF functions first to set up a connection between the end-users and SRF and then ask SRF to play announcements to end-users.

Other functional entities in an intelligent network are the various control-related functions such as the Service Creation Environment Function SCEF, the Service Management Function SMF, and the Service Management Access Function SMAF. SMF includes, among other things, service control, while SMAF offers an interface to SMF and SCEF makes it possible to define, develop, test and feed the IN services to SCF through SMF. Because these functions are solely related to the network operator functions, they are not shown in FIG. 1.

The role of the functional entities shown in FIG. 1 with regard to IN services is briefly explained below. CCAF receives the service request from the calling party that typically consist of lifting the receiver and/or a specific series of digits dialed by the calling party. CCAF forwards the service request to CCF/SSF for further processing. The Call Control Function CCF has no service data but it is programmed to recognize the need for a service request. CCF momentarily suspends the call set-up process to indicate the state of the call to the Service Switching Function SSF. SSF's tasks is, then, using a set of predefined criteria, to interpret the service request and so determine whether it relates to services provided by the intelligent network. If so, SSF will generate a standardized IN service request and send it, together with the information on the state of the service request, to SCF. SCF receives the request and decodes it. After this, it will cooperate with SSF/CCF, SRF, and SDF to provide the requested service to the end-user.

Figure 2:
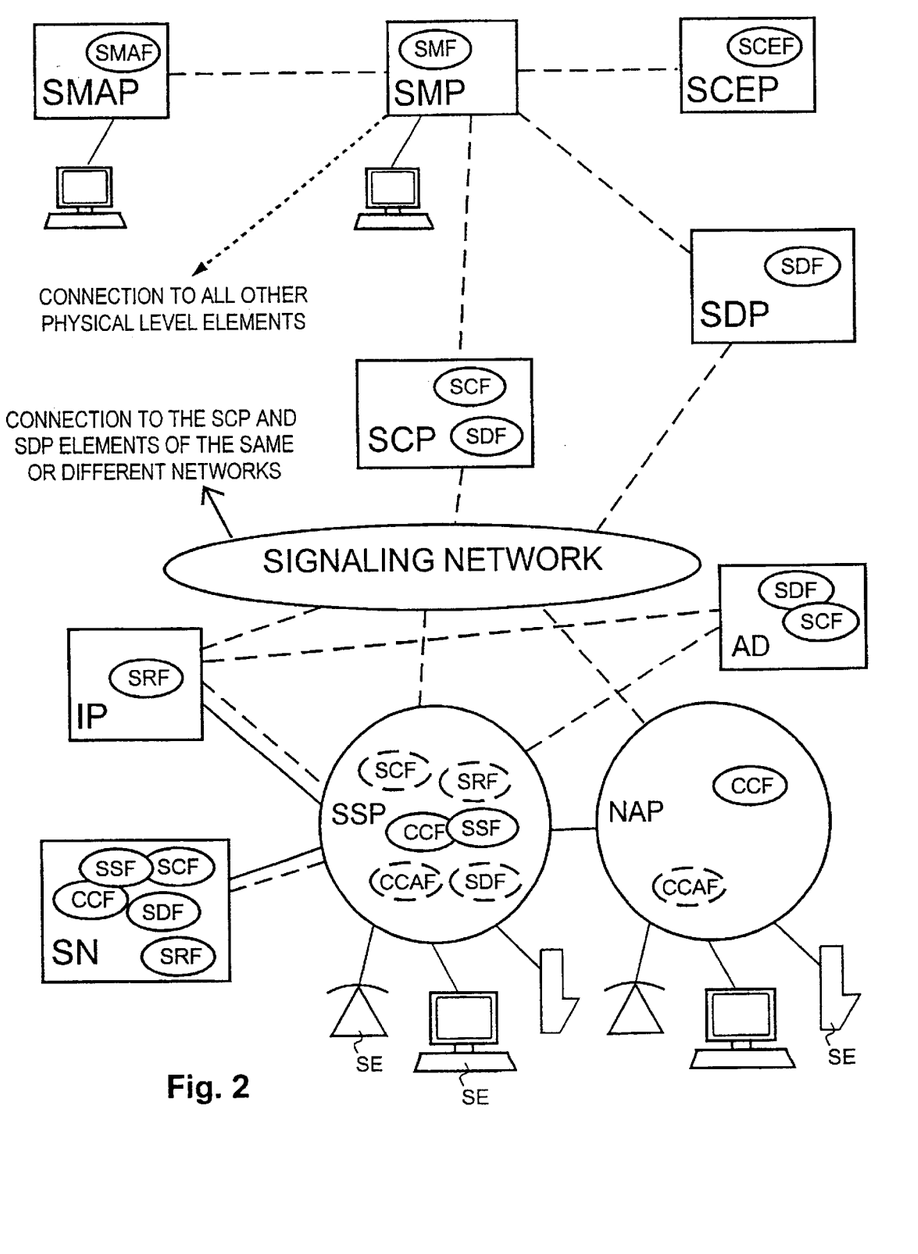
FIG. 2 illustrates the physical architecture of an intelligent network.

The physical-level architecture of an intelligent network indicates how the functional entities described above are distributed among the physical entities of the network. The physical architecture of an intelligent network is illustrated in FIG. 2 where the physical entities are shown as rectangles or circles and the functional entities as ovals. Signaling connections are represented by dashed lines and the actual transport, such as speech, by solid lines. Optional functional entities are denoted by dashed lines. The signaling network shown in the figure is a SS7 network (SS7, Signaling System Number 7, is a known signaling system that is described in CCITT's (currently ITU-T) blue book Specifications of Signaling System No. 7, Melbourne 1988).

Subscriber Equipment SE which can include, for example, a telephone, computer or fax machine, are connected either directly to the Service Switching Point SSP or to the Network Access Point NAP.

The Service Switching Point SSP offers the user access to the network and carries out all the necessary selection functions. SSP is also capable of recognizing requests for intelligent network services. Functionally, SSP includes the call control and service selection functions.

The Network Access Point NAP is a conventional telephone exchange, such as the applicant's DX 220 exchange, that includes the call control function CCF and is capable of distinguishing between conventional calls and calls requesting IN services and routing the IN service calls to the appropriate SSP.

The Service Control Point SCP includes the Service Logic Programs SLP used for generating intelligent network services. For the sake of brevity, SLPs may below also be referred to as service programs.

The Service Data Point is a database that contains information on customers and the network that SCP's service programs use to generate personalized services. SCP may use SDP's services directly through the signaling or data network.

An Intelligent Peripheral offers special functions such as announcements and voice and multiple choice recognition.

The Service Switching and Control Point SSCP consists of SCP and SSP housed in a single network element (meaning that if the SSP network element shown in the figure includes both the SCF and SSF entities, the unit involved is a SSCP).

The tasks of the Service Management System SMP is to manage the Service Data Point SDP, control and test the network and to collect network data. SMP can connect to any other physical entity.

The Service Creation Environment Point SCEP is used for defining, developing and testing the intelligent network services and entering the services into SMP.

The Adjunct AD corresponds to the Service Control Point SCP in terms of function, but it is directly connected to the SSP using a fast data connection (such as the ISDN 30B+D connection) instead of being connected via the common channel signaling network SS No.7.

The Service Node SN is designed to control IN services and perform data transfers with users. It communicates directly with one or more SSPs.

The Service Management Access Point SMAP is a physical entity that offers access to SMP for certain users.

The SCP network element may also be accompanied by a separate assisting SCP. This type of assisting SCP network element may be operated by the service provider that maintains subscriber-specific number translation or routing logic that is offered to the network operator's SCP network element to complement the control data existing there.

The foregoing provides a brief description of an intelligent network to serve as a background for the method in accordance with the present invention. An interested reader will find more information on intelligent networks by consulting ITU-T's Q.121X specifications or Bellcore's AIN specifications.

Figure 3:
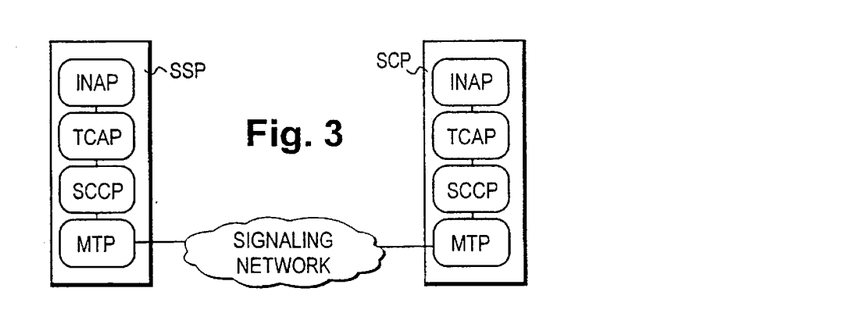
FIG. 3 illustrates a signaling connection between the SSP and SCP network element.

For example, the system uses the Intelligent Network Application Part INAP message set between SSP and SCP. (This message set is explained, for example, in the standard ETSI IN CS1 INAP Part 1: Protocol Specification, Draft prETS 300 374-1, November 1993, where an interested reader can find more background information). In the SS7 protocol stack, illustrated in FIG. 3, INAP is the highest layer, followed by the Transaction Capabilities Application Part TCAP, the Signaling Connection Control Point SCCP, and the Message Transfer Part MTP. Thus, the structure is layered in that a higher layer makes use of the services provided by the layer directly beneath it. The INAP layer provides the interface to IN services.

The standards do not specify the actual protocol to be used between SSP and SCP, only the INAP messages, some of which are used for transmission in one direction and some for transmission in the other direction. Fixed and optional parameters as well as "extension parameters" are defined for the messages. Thus, individual service logic programs may use the messages contained in the same INAP message set but in different order and with different parameter values. Consequently, it is the individual service logic programs that serve as the actual protocol level in the communications between SSP and SCP. Each service logic program sends INAP messages to the network and receives INAP messages from the network.

All these INAP messages have been defined using the ASN.1 definition language. ASN.1 (Abstract Syntax Notation 1) is a description language commonly used in the telecommunications field for defining and coding data structures.

To ensure correct operation of the system, incoming and outgoing message traffic must be monitored when the network element is commissioned, if not earlier. Moreover, the operator may be interested in monitoring messages while the network element is in operation. For the SCP network element, it is particularly important to monitor INAP messages because INAP is the protocol that provides access to intelligent network services.

To make it possible for the individual responsible for monitoring to actually check the message structure, the messages must be capable of being presented in their standard format, which, in reality, is the ASN.1 format. Traditionally, this monitoring is carried out when the message of the protocol level involved is otherwise processed anyway. For example, INAP messages have conventionally been monitored in connection with service logic programs because these programs create, in the SCP network element, the "locations" where the INAP messages would be processed anyway and where it is possible to access the INAP messages as such (in ASN.1 format). To put in other words, message monitoring is traditionally carried out in connection with the program blocks that would have processed the said messages anyway.

However, the drawback of this type of solution is that monitoring makes the "useful process", such as service programs, ever more complicated. Furthermore, if modifications need to be made for monitoring purposes, the changes must be made to all the service programs. This has an adverse effect on the reliability of service programs because service programs must be processed in connection with each such modification.

Alternatively, it is conceivable that the messages of the selected protocol level are monitored using lower-protocol-level messages; for example, INAP messages could be monitored already at a lower level (TCAP). However, this is often complicated. For example, the TCAP messages from the network are BER-coded (BER, Basic Encoding Rules), so that checking for the correct INAP message structure in such a bit string is extremely complicated.

SUMMARY OF THE INVENTION

The purpose of the present invention is to eliminate the said drawbacks and to provide a solution that makes it possible to efficiently monitor the messages for validity and in such a way that the implementation is simplified.

This goal is achieved by using a solution in accordance with the invention as defined in the independent patent claims.

The idea of the invention is to completely separate the functionality relating to message monitoring from the useful programs processing the message by creating, parallel to these useful program blocks, a centralized program block for monitoring the messages. This program block receives a copy of the message to be monitored, received from or sent to the network.

When using the solution in accordance with the invention, it is no longer necessary to make changes to service logic programs when the monitoring function is to be added to a network element (or similar entity), or when changes are to be made to the existing monitoring function. As a result, it is easy for a network element supplier to incorporate the monitoring functions even in the existing network elements. Since in this way useful programs (such as service programs) remain external to the actual implementation of monitoring, they will be simpler and more clear-cut in this respect, which is important to the service provider. At the same time, the reliability of service is improved.

BRIEF DESCRIPTION OF THE DRAWINGS

The invention and its preferred embodiments are explained in greater detail with reference to the examples shown in FIGS. 4 . . . 10 in the accompanying drawings where.

DETAILED DESCRIPTION OF THE INVENTION

When a network subscriber initiates a call, the terminal exchange of the subscriber first receives information on the calling subscriber's desire to place a call. This information can arrive at the exchange for example as a Setup message in accordance with standard Q.931. If the terminal exchange is not an SSP exchange, it can route the call attempt to an SSP exchange.

When the call control of the SSP exchange detects that a subscriber is concerned who needs IN services, transfer of the control to the IN is triggered and processing of the call attempt is "frozen". The SSP exchange then sends to the SCP an Initial_DP message, which is a standard message between the SSF and SCP, generated by the SSF upon detecting at any detection point of the call state model that a service request is necessary (a detection point is a point in the call state model at which the control can be transferred to the IN). Initial_DP is thus the message that starts the dialog between the SSP and the SCP relating to the provision of each service. The information elements included in the message by the SSP exchange include at least the calling and called number and a service key.

Figure 4:
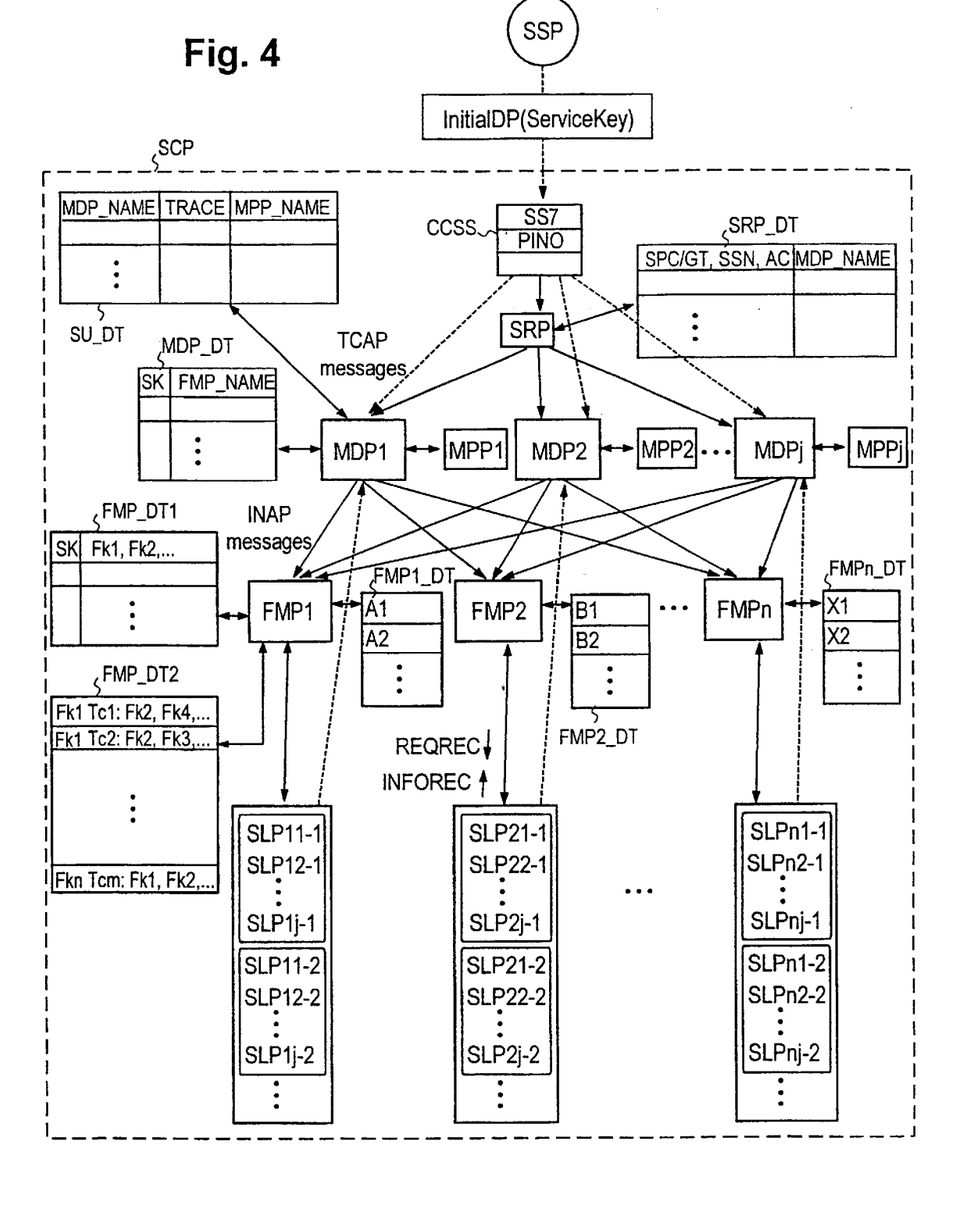
FIG. 4 illustrates the functional architecture of a SCP network element in accordance with the invention in terms of the parts essential to the service logic software.

FIG. 4 illustrates the functional architecture of an SCP network element in accordance with the invention seen from the point of view of the service programs. The service requests arriving at the network element come through a common channel signaling stack CCSS (cf. FIG. 3) to the receiving program block SRP (SS7 Receiver Program). One such receiving program block is provided for each common channel signaling stack of the SCP network element. For simplicity, the example of the figure only shows one stack and one receiving program block.

If one SCP network element is connected to more than one SSP network element in which different versions of the INAP message set are used, the definition of the data content of the data messages received by the SCP is different depending on which SSP the SCP is communicating with. For this reason, further processing bf the messages from the receiving program block onwards must in practice be differentiated in accordance with which INAP message set is concerned. On the other hand, the receiving program block SRP is independent of the INAP message set employed.

The receiving program block SRP receives from the network (from SSF entities) standard TC_BEGIN messages. The task of the program block is to identify the relevant INAP message set version on the basis of the TC_BEGIN message and to forward the INAP messages contained in the component primitives further to the message distributor program block MDPi corresponding to said message set, wherein i=1,2, . . . j and j is the number of different INAP message sets used.

Hence, at the level next to the receiving program block the network architecture includes program blocks MDPi (i=1, . . . j), one for each INAP message set used. Each distributor program MDPi receives TCAP messages from the network and forwards INAP messages, receives INAP messages from the service logic programs, and sends TCAP messages to the network. (A TCAP message comprises a header and one or more component primitives. Each component primitive can contain one INAP message at most. Each component primitive also has a subheader of its own. All of these header parts are produced when messages are sent to the network and they are removed when messages are received from the network.)

When an initiation request for a service dialog—which arrives as a TC_BEGIN primitive (containing an Initial_DP message)—is received on a network element, a new instance of the receiving program SRP is created that will search the correct distributor program block, create an instance thereof for the use of said service request, and transmit a TCAP message to said instance. Thereafter the instance of the receiving program block is deleted. The distributor program instance receives all TCAP messages subsequently arriving from SSP. The search for the correct distributor program takes place in such a way that the receiving program block SRP reads from the header of the TC_BEGIN message either the identifier of the sending SSP network element (SPC, Signaling Point Code, or GT, Global Title) and additionally the identifier of the subsystem (SSN, SubSystem Number), or alternatively the relevant application context identifier AC, and searches on the basis thereof from the data table SRP_DT of the SRP level the name of the distributor program, MDP_NAME, corresponding to the INAP message set in question.

Thus, the architecture of the SCP exchange includes for each INAP message set a dedicated program block MDPi, the task of which is to decode the received messages (at least the Initial_DP message containing the service key parameter) and to distribute the messages to their correct receivers.

Additionally, for each distributor program block MDPi, the network element features a monitoring program block MPPi (I=1, . . . j) in accordance with the invention for monitoring the message. This program outputs the contents of the INAP messages received as input on the selected output device, such as a printer or display.

For performing monitoring, the SCP network element also includes the data table SU_DT that contains the start-up parameters, for example, one row for each message distributor program. The row may, at least, contain information on whether monitoring is to be performed (TRACE field) and the name of the monitoring program (MPP_NAME) to which the copy of an INAP message is to be sent, if monitoring is to be carried out. This type of data table is created in the commissioning phase, if not earlier. When a TCAP message is received, the message distributor program receiving the message already knows whether monitoring is to be performed or not, and if so, the name of the monitoring program to which the message copy is to be sent. The operation of the distributor and monitoring programs will be discussed in more detail later in this document.

In the functional hierarchy of the network element, the main program blocks are located at the next hierarchy level after the distributor programs. These main program blocks are denoted by FMPi (Feature Manager Program). The main program blocks constitute the processes controlling the actual service logic programs SLP, supplying them with the data they need. Thus, the main program blocks are responsible for managing the services and features. (A subservice, for which the above term "service feature" is employed in the international standards, will also be termed "feature" in the present context. A service feature is the (smallest) component visible to the customer or subscriber that the service obtained by him/her comprises.)

The message distributor programs distribute each service request to the correct main program block. To enable this, there is a dedicated data table MDP_DT for the distributor programs, in which the service key value SK is presented at the beginning of each data row as a search key. On the basis of the service key value that arrived in the Initial_DP message, the distributor program block searches from the data table the correct row in which it finds the identifier of the main program block (FMP_NAME) that serves as the recipient in the case of said service key value. The data table is preferably common to all distributor program blocks MDPi. Having found the correct main program block, the distributor block instance creates therefrom an instance for the use of said service request and forwards an INAP message to said instance.

Since service logic needs are different for different object types, it is advantageous to implement the SCP network element in such a way that it has separate main program blocks for the logically distinct main object classes contained in the SSP exchanges. Said classes may include calling subscriber class, called subscriber class, destinations (beginning of dialed number), subdestinations (the entire dialed number), routes, circuit groups, etc. Furthermore, the subscribers may be in different classes according to which network they belong to (for example a fixed network or mobile network). Objects in this context denote such network-related entities to which information can be attached in the network element—e.g. in the case of an intelligent network in an SSP network element—indicating, for an individual call attempt, whether a service request is to be sent to the network element offering services (which in the case of an intelligent network is an SCP network element).

As stated previously, each distributor program block utilizes the service key parameter that arrived in the service request message to define the receiving main program block. This means that for service requests relating to a given main object class (e.g. calling subscribers), the SSP exchange has to set a service key value that is different from the service key value of objects belonging to another class (e.g. called subscribers) (even though service of the same type is concerned). A wide variety of service key values may correspond to a given main program block, but the service key value sets relating to two different main programs may not overlap.

Each main object class has a dedicated data table FMPi DT (i=1,2, . . . n). These data tables will be termed main tables in the following. Thus, the SCP network element has a dedicated main table for each main program block. Each main table has one data row for each object belonging to said class. For example, the data table (FMP1_DT) used by the main program block FMP1 relating to calling subscribers has one data row for each calling subscriber Ai (i=1, 2 . . . ), the data table (FMP2_DT) used by the main program FMP2 relating to called subscribers has one data row for each called subscriber Bi (i=1, 2 . . . ), the data table used by the main program relating to subdestination objects has one data row for each subdestination in use, the data table used by the main program relating to destination objects has one data row for each destination in use, etc.

Figure 5:
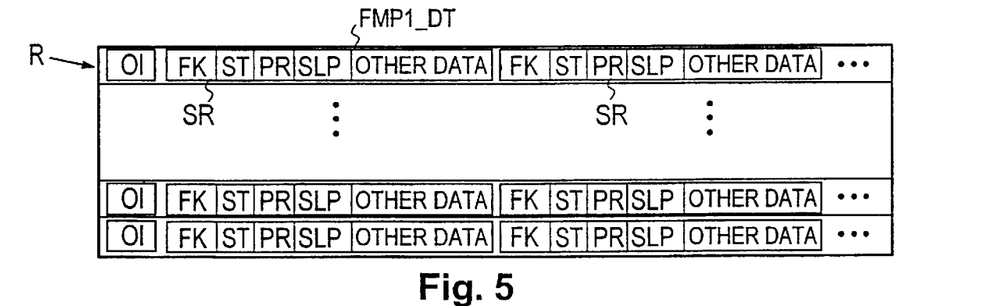
FIG. 5 illustrates the contents of an object-specific data row.

In each row of the main tables, information is stored in the manner shown in FIG. 5, defining what kind of feature set said object has activated. An object identifier OI is stored at the beginning of each row R as a search key. The main program block searches the correct row from its data table by means of the value of the object identifier contained in the INAP message. The row contains successive subrecords SR, one for each feature. At the beginning of each subrecord, there is a field FK containing a feature key Fki (i=1,2 . . . ), indicating which feature is concerned. Thereafter the subrecord may have for example a status field ST, containing information on whether said feature is active or passive, and a priority field PR, containing a priority number. These priority numbers of subrecords indicate the relative order of execution of the features. Each subrecord further has at least field SLP, containing the identifier of the service logic program that executes said feature. The service logic programs form the lowest hierarchy level of the network element.

Preferably there are dedicated service programs for each main object class. Furthermore, there is a clone of each program dedicated to each INAP message set (i.e., each distributor program). In the figure, the service programs are denoted with reference SLPxy-z, where x indicates the main object class to which the program belongs, y indicates the INAP message set to which the program belongs, and z indicates the consecutive number of the program within the main object class.

In accordance with the hierarchy of the network element, the instance (SLPi) of the lowest level of one service request dialog is called a child, the instance of the next level (FMPi) is called the parent, and the instance (MDPi) of the level next to that is called the grandparent. An older instance always begets the younger instance.

In practice, one feature implemented by a service logic program may be for example playing of an announcement to the subscriber ("play an announcement") or an operation by which the calling subscriber is requested to dial additional numbers ("prompt and collect user information"), or a connect operation (a CONNECT message is sent to the SSP exchange, by which the SSP exchange is requested to connect the call to a given address).

The order of execution of the features can be indicated for example in the above-stated manner by adding a priority number field PR to the subrecords, in which case said numbers indicate the relative order of execution of the features. There are also other alternatives for achieving the correct order of execution. This way, however, is simple and makes it possible that the same service key value can indicate a different order of execution e.g. for two different calling subscribers.

In addition, one or more separate data tables are provided for the main program blocks, having a data row for each service key value that is in use in the domain of several different main program blocks. The example in the figure has one data table FMP_DT1 that is common to all program blocks (all main program blocks read said data table). At the beginning of each data row in the data table, the service key value SK is provided as the key. Each row contains data on the features Fki (i=1,2 . . . ) relating to said service key value, that is, on the services that are allowable features in the case of said service key value. Furthermore, the row may contain information as to in which order these features are executed, or the order of the feature keys may directly indicate the relative order of the features. The main program block reads from this data table the row corresponding to the received service key value, whereby it finds the set of features that are allowable features in the case of said value. Thereafter the main program block reads from its dedicated data table FMPi_DT (i=1,2 . . . ) the row corresponding to the identifier of said object (e.g. calling subscriber). From this row, the main program block finds the identifier of the service logic program SLPi (i=1,2 . . . ) that is to be started. From the row of the class-specific table FMPi_DT (for instance the table of calling subscribers), the main program block takes into consideration only those features which relate to said service key value (i.e. the ones belonging to the allowable set searched above), and of these eventually only those indicated as active at said object.

At this stage of execution of the service request, the features relating to the object and their relative order of execution are known. Thereafter the main program block produces an instance of the service logic program corresponding to the feature that is the first in turn and requests it to start execution of the service.

The FMP instance thus sends an Initial_DP message to the service program which has the highest priority and whose identifier the main program block read from the relevant subrecord of the object-related row. First, however, a separate request message REQREC is sent to said SLP instance, since the Initial_DP message must be sent in its standard format (ASN.1 format) in which its information content is not sufficient. The service logic program thus needs also other data in addition to that contained in the INAP message, for example the value of the feature key, which it receives in the request message.

Figure 6:
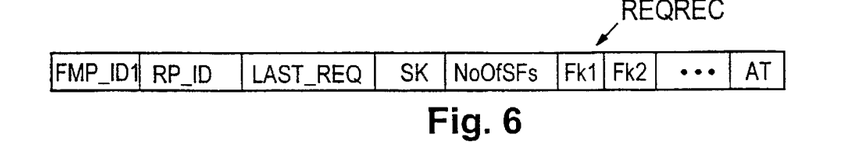
FIG. 6 shows the structure of the service request message sent to a service logic instance.

FIG. 6 shows an example of the data structure of the request message sent. The request message first has a field FMP_ID1, containing the identifier of the sending FMP instance. Thereafter follows a field RP_ID, containing the identifier of the program block to which the SLP should send its messages relating to this dialog. These acknowledgment messages can be sent both to the FMP instance (parent) and the MDP instance (grandparent). By sending acknowledgment messages to the distributor program instance, the load on the main program blocks can be diminished, since the MDP instance attends to the sending of outbound messages to the network in any case. The next field LAST_REQ contains a Boolean variable indicating whether still another request message is bound for the SLP instance after it has executed the features which were requested in that request message. The field SK contains the service key value obtained from the SSP network element. The next field, NoOfSFs, indicates the number of features contained in the request message, and the fields Fki (i=1,2 . . . ) subsequent to said field contain the keys of said features. The last field AT contains a description of how the service dialog is to be terminated if the execution of the features fails.

In the environment used in this example, the structure of the service programs is such that they are composed of parts each of which executes a given feature. Thus each SLP executes only those features whose feature keys arrive in the request message. If more than one feature belonging to the allowable features is active in the object-related row and the same SLP identifier is related to all said features, the FMP can send all these feature keys in one request message (providing that it is otherwise allowable to execute all said features in succession). If the features contain the identifier of several different SLP programs, the FMP instance sends request messages to said SLP programs in the order indicated by the subrecords in the object-related row. The procedure may also be such that only one feature key is sent in one request message.

Having executed the feature, the SLP sends an acknowledgment message INFOREC to those elements (parent and/or grandparent) which are indicated in the request message REQREC. In the acknowledgment message, the SLP instance also indicates in what manner the feature was terminated. If, for example, the execution of the feature fails, the feature to be executed next can be different compared to a normal case in which the execution of the feature is successful.

Figure 7:
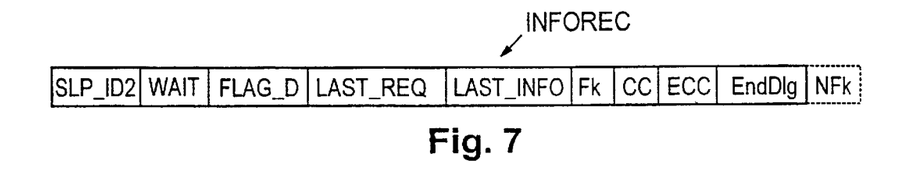
FIG. 7 shows the structure of the acknowledgement message sent by a service logic program instance.

FIG. 7 illustrates one possible structure of an acknowledgment message INFOREC sent by an SLP instance. The first field SLP_ID2 indicates the identifier of the sending SLP instance. The next field WAIT contains for example information on whether a response is awaited from the network before the service can be continued. The field FLAG_D contains a Boolean variable indicating whether the SLP instance terminates itself after sending of an acknowledgment message or not. The field LAST_REQ again contains the same information that the child has last received from the parent in said field (the grandparent thus also receives said information). The next field LAST_INFO again contains a Boolean variable indicating whether the SLP instance has completed the last feature of the request message it received. The next field Fk contains the key of the feature in which said message arrives as an acknowledgment. The field CC contains the termination code of the feature just completed. The field ECC can indicate slight errors for which a separate error message need not be sent. The field EndDIg contains information on in which way said SLP instance desires its grandparent to terminate said dialog. The dialog can have different ways of termination, for example depending on whether a message is desired to be sent to the network, or if a message is sent, what information elements are included in the TC_END primitive to be sent.

The acknowledgment message can further contain a field NFk, in which the key of the feature that should be executed next can be indicated.

Since the internal messaging within the network element does not relate to the actual invention, it will not be described in detail in this context. Generally speaking, is can be stated that the service program instances receive both internal messages and messages arriving from the network (INAP messages), that the (internal) request and acknowledgment messages are used to attend to the execution and concatenation of the features, and that the acknowledgment message can also be used to indicate how the execution of the feature succeeded and possibly also which feature is to be executed next.

The structure and operation of the service logic programs are not described here in more detail because the present invention is not related to the implementation of the same.

As mentioned above, the service logic programs in the environment used as an example are such that they consist of components each of which executes a specific subservice. If an interested reader wishes to have more background information on the subject, implementation of such service logic programs is described in International Patent Applications PCT/FI99/00077, PCT/FI99/00078, and PCT/FI99/00080 . . . PCT/FI99/00082. However, the solution in accordance with the invention is independent of the way the services are implemented. In other words, use can be made of the solution in accordance with the invention even if the services are implemented in other known ways. Thus, as far as the implementation of the services is concerned, the functional architecture of the network element may vary.

A more detailed description of the performance of monitoring in the environment described above is provided in the following.

Figures 8, 9:
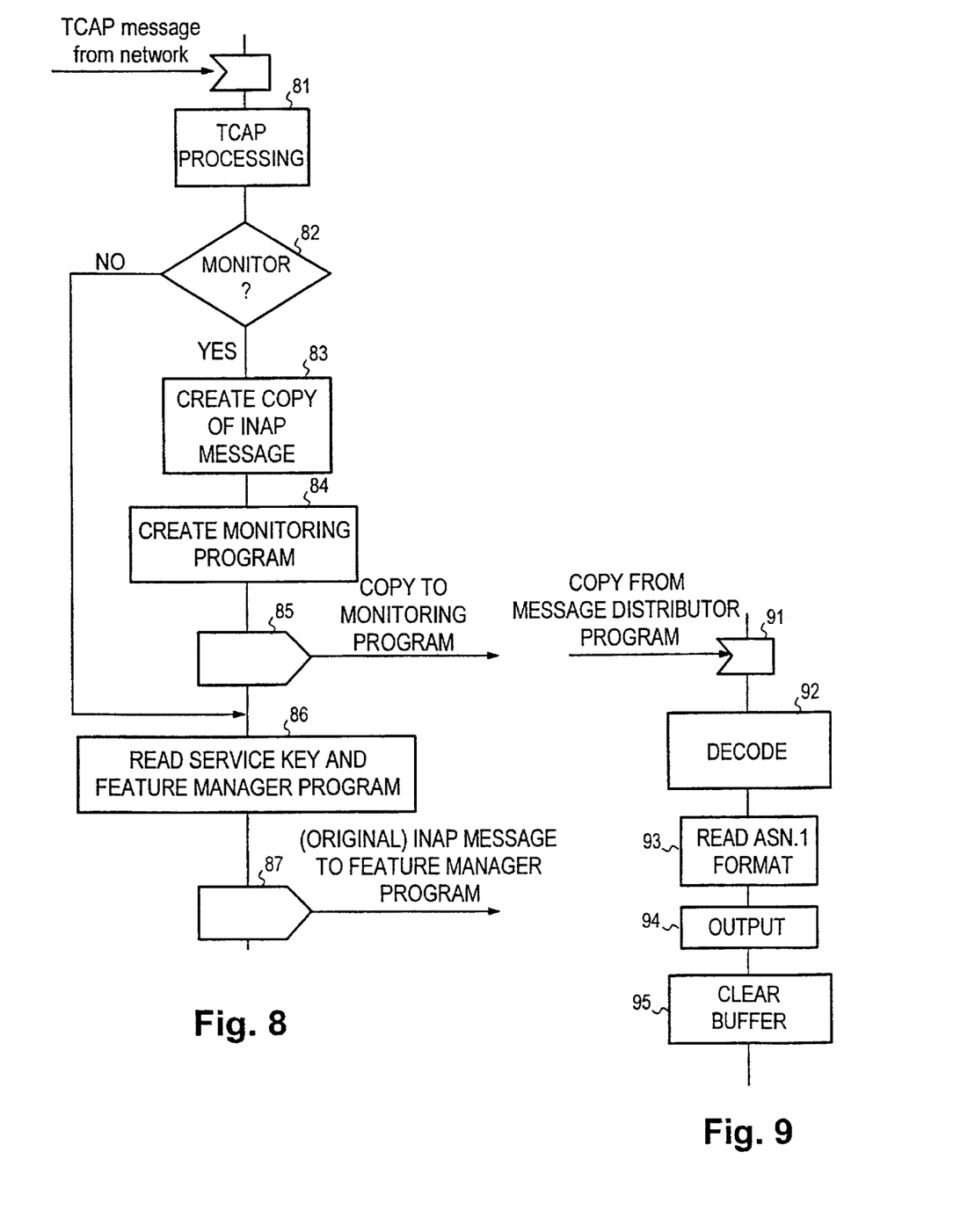
FIG. 8 illustrates the processing of one message, received from the network, by the message distribution program of the SCP network element.
FIG. 9 illustrates the operation of the monitoring program for one message.

FIG. 8 illustrates the operation of the message distributor program block in respect of one TCAP message coming from the network. Once the message has been received, the message is first processed at the TCAP level (phase 81), as a result of which the INAP message can be extracted from within the TCAP message. However, in phase 81, message monitoring can be performed only at the TCAP level at which the actual message processing takes place. After this (phase 82) a check is made to determine whether monitoring is to be carried out or not. If no monitoring is to be carried out, the process jumps directly to phase 86, where the feature manager program to which the INAP message is to be sent is read from the MDP_DT data table based on the service key value contained in the message. If monitoring is to be carried out, a copy of the INAP message is made (phase 83). Next, an instance of the monitoring program is created for the INAP message involved (phase 84) and the copy of the INAP message is sent to the said instance (phase 85). Upon completion of these phases, the system reverts to normal operation, where the feature manager program to receive the message is identified (phase 86) and the original message is sent to the said feature manager program (phase 87).

In the opposite transmission direction, the message distributor program receives INAP messages from service logic programs. Naturally, the process is reversed in the sense that the TCAP message to be sent to the network is not generated until the INAP message is first processed and a copy of the INAP message is sent to the monitoring program. Normally, it is not necessary to create a monitoring program instance in this transmission direction because i usually already exists at this point. However, there are services for which a monitoring program instance must be generated; one such service is the wake-up call service for which there is no preceding message from the network.

FIG. 9 illustrates the operation of the monitoring program MPPi in respect of one such message copy that results from a message received from the network. Once the copy of the INAP message is received from the message distributor program in phase 91, the message is decoded using a known method (phase 92), if the message is in BER format (as messages coming from the network usually are at this point). After decoding, the message is in the ASN.1 format. In other words, after decoding, the message is stored in memory in such a way that the data structures in accordance with the ASN.1 message definition can be distinguished in the various memory areas that show which rows of the message definition are included in the message. To perform decoding, the same service-independent building block (SIB) is preferably invoked that is used for decoding the original message in the service logic program. For each INAP message type, there is a dedicated decoding function. After this, the ASN.1 format message is read from the memory (phase 93) row by row and outputted (phase 94) to a file or display where it can be viewed. Reading can be carried out in the same way as in the service logic programs. One possible method of implementation is described in the International Patent Application PCT/FI99/00300.

When messages are transferred towards the network, the monitoring program can operate in an identical fashion. However, no decoding function is required if the INAP message is not converted into the BER format until just before TCAP processing.

Figure 10:
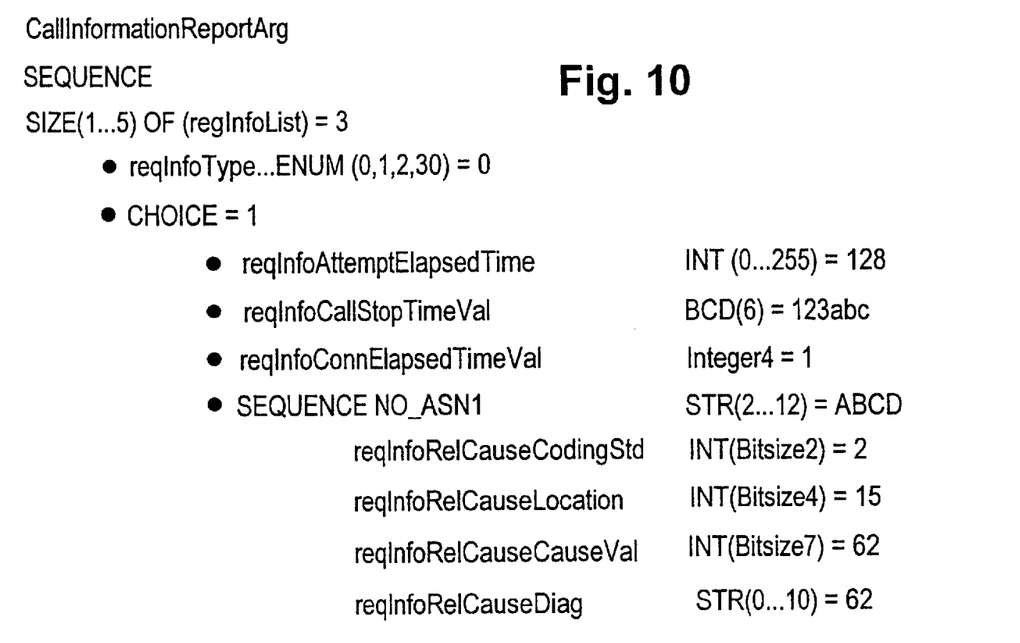
FIG. 10 shows an example of the output from the monitoring program.

FIG. 10 shows, by way of an example, what an output from the monitoring program can look like. The message involved is an INAP message with the name CallInformationReportArg that SSP sends to SCP. However, the message type or direction of transmission are not essential to the invention because all messages are processed in the same way. As shown in the figure, the ASN.1 definitions of INAP messages consist of text rows. These text rows can be sub-divided into types; for example, the division can be made according to whether the rows are related to actual message parameters or whether they represent embedded ASN.1 data structures contained in the message.

The monitoring program block outputs the received message in its standard format (ASN.1), so that the output shows those text rows of the ASN.1 definition for the message type involved that have corresponding parameters or data structures contained in the message, and the values corresponding to the said text rows. The program block is also capable of outputting the message in BER format.

As explained in the foregoing, according to the invention a branch is created in the network element for monitoring purposes, and a copy of the message to be monitored is transferred through the branch to the monitoring process. As a result, monitoring is carried out independently of the actual "useful process", and it does not interfere with the processing of the original message. Monitoring, as such, is carried out using a known method.

Although the invention is above explained with reference to the examples given in the accompanying drawings, it is obvious that the invention is not limited to the said examples, but can be varied within idea of the invention presented above and the attached patent claims. As mentioned earlier, the solution in accordance with the invention can be used in a number of similar environments where it is necessary to monitor messages of a certain protocol level and where interpretation of the message is difficult to carry out other than in connection with message processing at the said protocol level. One such environment is the local area network. An alternative protocol is SNMP (Simple Network Management Protocol) used in TCP/IP networks where SNMP messages travel in the BER format, just like INAP messages in the SS7 network.

What is claimed is:

1. A method for monitoring messages of a selected protocol level in a network element in a data communications network, the method comprising:

forwarding messages through a protocol stack, the protocol stack having several protocol levels, whereby messages which are being forwarded through the protocol stack are being processed by program blocks relating to the protocol levels;

processing a message of a first protocol level by a first program block for forming a message of a selected protocol level, the first protocol level being adjacent to the selected protocol level;

forwarding the message of the selected protocol level to a second program block for forwarding the message through the protocol stack;

creating, in addition to the program blocks relating to the selected protocol level, a separate monitoring block in the network element for monitoring messages of the selected protocol level;

sending a copy of the message of the selected protocol level to the monitoring block for implementing monitoring; and monitoring the message of the selected protocol level.

2. The method according to claim 1, further comprising monitoring INAP messages in an SCP network element of an intelligent network, wherein the monitoring block outputs the INAP messages at least in ASN.1 format.

3. The method according to claim 2, further comprising the monitoring block outputting the INAP messages in BER format.

4. The method according to claim 1, further comprising sending an INAP message to the monitoring block in BER format and decoding the BER format in the monitoring block and program blocks into ASN.1 format using a service-independent building block.

5. The method according to claim 1, further comprising monitoring INAP messages in an SCP network element of an intelligent network, wherein monitoring is carried out both for messages to be received and messages to be sent.

6. A network element arrangement in a telecommunications network including several network elements where messages are sent from one network element to another, the network element arrangement comprising:

means for forwarding and transferring messages via a protocol stack, the protocol stack having several protocol levels;

program blocks relating to the protocol levels for processing messages which are being transferred via the protocol stack;

means for monitoring messages of a selected protocol level, the means for monitoring including means for copying messages of the selected protocol level forwarded from a first program block relating to a first protocol level, the first protocol level being adjacent to the selected protocol level; and a monitoring block, distinct from the program blocks relating to the selected protocol level, for receiving and outputting copied messages of the selected protocol level.

* * * * *